United States Patent [19]

Kuwahara

[11] 4,080,516
[45] Mar. 21, 1978

[54] MULTI-FREQUENCY SIGNAL RECEIVER
[75] Inventor: Hiroshi Kuwahara, Kodaira, Japan
[73] Assignee: Hitachi, Ltd., Japan
[21] Appl. No.: 729,255
[22] Filed: Oct. 4, 1976
[30] Foreign Application Priority Data
    Oct. 6, 1975   Japan ............................ 50-119741
    Aug. 30, 1976  Japan ............................ 51-102669
[51] Int. Cl.² ........................................... H04M 1/26
[52] U.S. Cl. ............................................. 179/84 VF
[58] Field of Search ............... 179/84 R, 84 VF, 2 A; 328/138, 140

[56] References Cited
    U.S. PATENT DOCUMENTS
    3,539,731  11/1970  Legedza ...................... 179/84 VF Primary Examiner—Kathleen H. Claffy
Assistant Examiner—Joseph A. Popek
Attorney, Agent, or Firm—Craig & Antonelli

[57] ABSTRACT

A multi-frequency signal receiver includes a multi-operation digital filter for frequency discriminating digitalized multi-frequency signals from a plurality of push-phone type telephone sets. In order to enhance the efficiency of utility of the digital filter, a signal detection circuit is provided for each telephone channel to detect the beginning, the duration and the end of an input signal for controlling the connection between the telephone channel and the digital filter for a predetermined time period from the beginning of the signal in accordance with the result of the detection, whereby a time period during which the telephone channel occupies a specific filter channel is shortened.

5 Claims, 12 Drawing Figures

MULTI-FREQUENCY SIGNAL RECEIVER

BACKGROUND OF THE INVENTION

1. Field of the Invention

The present invention relates to a multi-frequency signal receiver, and more particularly to a receiver including a digital filter for detecting digitalized multi-frequency signals, such as dialing signals of push-phone type telephone sets or multi-frequency station selection signals.

2. Description of the Prior Art

Recently, in the art of a telephone switching system, the utility of a time division PCM switching system using a pulse code modulation (PCM) for a speech signal has been studied. In such a time division PCM switching system, a dialing signal of a push-phone (hereinafter referred to as PB signal) is also digitalized and coupled to a PB receiver via a time division speech path switching network. The PB signal as defined herein is a signal sent out to the switching system as a selection signal from a push-phone type telephone set, the signal frequencies of which comprise a group of lower frequency components including 697 Hz, 770 Hz, 852 Hz and 941 Hz and a group of higher frequency components including 1209 Hz, 1336 Hz and 1477 Hz. The PB signal consists of a combination of two frequency components, one selected from the lower frequency component group and the other selected from the higher frequency component group, to represent a dial number. For example, the combination of 697 Hz and 1209 Hz corresponds to dial number "1."

It has been proposed to receive such a digitalized multi-frequency signal by means of a digital filter. (For example, refer to the article "An Approach to The Implementation of Digital Filters" by L. B. Jackson, J. E. Kaiser, and H. S. McDonald, IEEE Trans. on Audio and Electroacoustics, Vol. AU-16, No. 3, 1968, pp 413–421).

The PB signal receiver using the digital filter has an advantage of being capable of multi-processing, that is, capable of processing a plurality of subscriber lines by a single receiver (or digital filter) because the processing speed of the digital filter is so high that it permits the reception of the PB signal from other subscriber line when the PB signal from a specified subscriber line is absent. However, in the prior art PB signal receiver using the digital filter, the digital filter has been used to discriminate the frequency components included in the PB signal as well as to determine the beginning, the duration and the end of the PB signal. Accordingly, so long as the PB signal in question lasts, the digital filter must be kept connected to the subscriber line of that PB signal. Thus, the prior art system has a drawback that the function of the digital filter is utilized only for the discrimination and the digital filter is wastefully kept connected during the duration of the PB signal after the completion of the discrimination.

SUMMARY OF THE INVENTION

It is a general object of the present invention to provide a multi-frequency signal receiver which can effectively process signals including multi-frequency components from a plurality of transmission channels.

It is another object of the present invention to enhance the efficiency of utility of a digital filter in a multi-frequency signal receiver.

It is a further object of the present invention to improve a PB signal receiver in a PCM telephone switching system and to enhance the multiplicity of the PCM telephone switching system and to increase the processing speed thereof.

The above objects of the present invention are accomplished by a receiver for discriminating frequencies of a plurality of digitalized multi-frequency signals by means of a digital filter, wherein a signal detection circuit is provided for each of receiver input terminals to detect the beginning, the duration and the end of an input signal, and the input terminal is connected to the digital filter for a predetermined time period, which is very short relative to the duration of the PB signal, from the beginning of the input signal in accordance with the result of the detection, whereby the period during which the digital filter is connected to a subscriber line is shortened to enhance the efficiency of the utility of the digital filter.

It should be understood that the multi-frequency signal is not limited to the PB signal but it encompasses a signal comprising a combination of a plurality of frequency components to represent number, mark or station, such as a multi-frequency interstation selection signal. (hereinafter referred to as MF signal). While the following specific example refers to a PB signal receiver at which the present invention finds its most effective use, it should be understood that the present invention is not limited to the specific example illustrated.

The above and other objects, features and advantages of the present invention will become more apparent from the following detailed description of the invention when taken in conjunction with the accompanying drawings.

DESCRIPTION OF THE PREFERRED EMBODIMENTS

To facilitate the understanding of the operation and features of the present invention, the construction and operation of a basic digital filter is briefly explained.

Figure 1:
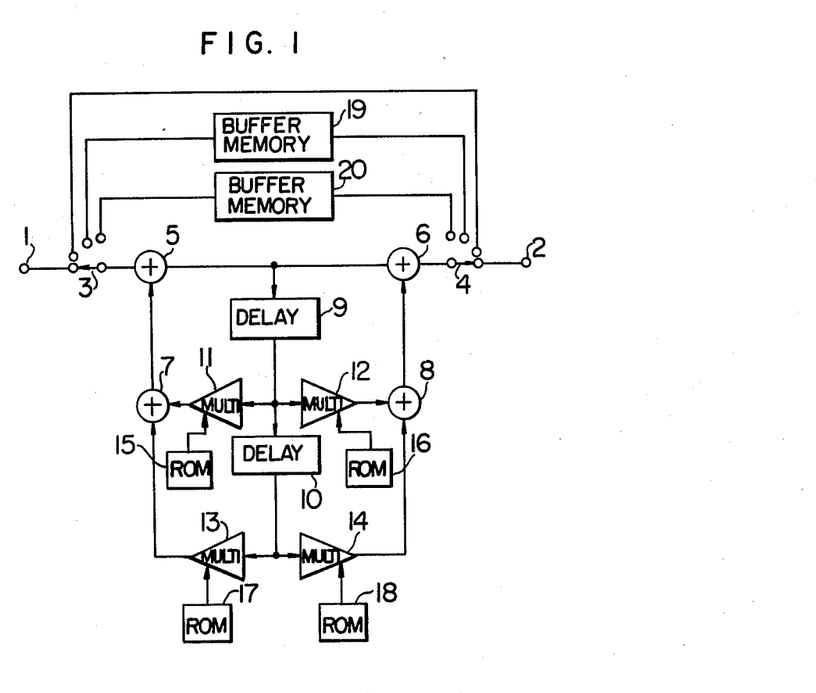
FIG. 1 is a block diagram showing a general construction of a second order recursive digital filter.

FIG. 1 is a block diagram showing an example of a conventional second order recursive digital filter, in which 1 and 2 are input and output terminals, respectively, 3 and 4 are switches for specifying flow of operation data, 5 to 8 are one-bit full adders for serial addition, 9 and 10 are delay circuits having delay time corresponding to one sampling period of PCM signal, 11 to 14 are multipliers, 15 to 18 are read only memories (ROMs) for presenting multiplier coefficients to the multipliers, 19 and 20 are buffer memories for temporarily holding operation output of the digital filter.

By changing the coefficient, a single digital filter may produce various transfer functions. The construction and operation of second order digital filters have been well known. (See "Digital Signal Processing in Telephone Switching" by H. C. Alles et al, 1972 International Conference on Communication Record, pp 18E-1 ~ 18E-2.)

Figures 2A, 2B:
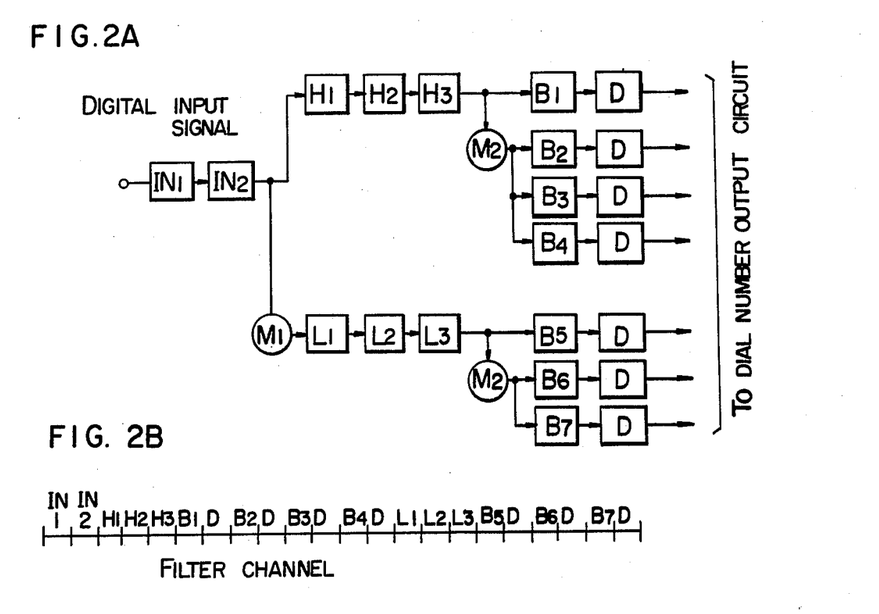
FIG. 2A shows filter channels for explaining the operation of the digital filter shown in FIG. 1.
FIG. 2B is a time chart showing a time relation of the filter channels shown in FIG. 2A.

FIGS. 2A and 2B show signal flow and time chart, respectively, of the digital filter acting as a PB signal receiver, in which 1N1, 1N2, H1, H2, . . . represent functions of the digital filter (hereinafter referred to as filter channel) and the lines between blocks represent that an output signal of one filter channel is coupled to an input of the following filter channel. M1 and M2 are not filter channels but they represent that operation data are stored in the buffer memories 19 and 20, respectively. For example, M1 represents that the output signal from the filter channel 1N2 is stored in the buffer memory 19 at the end of the operation of the filter channel 1N2 and the filter channel L1 reads out the stored data from the memory 19 for filtering the data. Various functions in the filter channels can be obtained by switching the switches 3 and 4 and by changing coefficients stored in ROMs by signals from a control circuit (not shown). FIG. 2B shows an example of time relation of the filter channels. In the drawing, 1N1 and 1N2 are filter channels for eliminating frequency component of 400 Hz which is a dial tone included in the PB signal, H1 to H3 are filter channels for eliminating the group of higher frequency components, L1 to L3 are filter channels for eliminating the group of low frequency components, B1 to B4 are band pass filter channels which pass the respective components of the group of lower frequency components, B5 to B7 are band pass filter channels which pass the respective frequency components of the group of higher frequency components, and D is a low pass filter channel for discriminating the presence or absence of output signals from the band pass filter channels B1 to B7.

For the PB signal from a given subscriber line, the above 22 filter channels (or functions) are performed for each sample of the PB signal, (the sample period being hereinafter referred to as a frame) to receive one telephone channel or subscriber line.

Figure 3A:
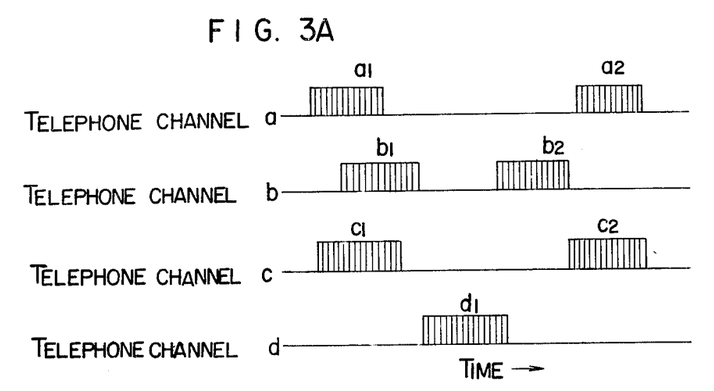
FIG. 3A is a time chart showing a distribution of PB signals from a plurality of telephone channels.
Figure 3B:
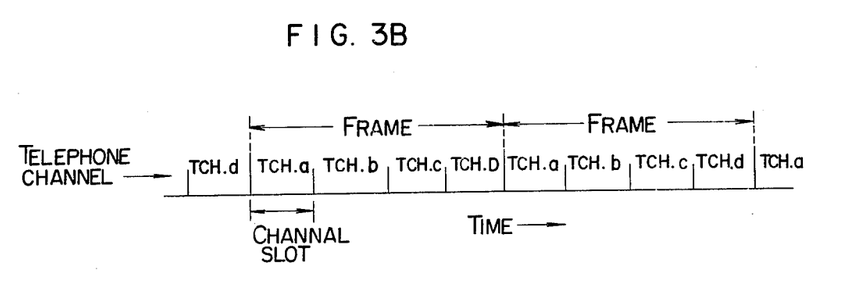
FIG. 3B is a time chart in time division multi-processing the plurality of PB signals by means of a single digital filter.
Figure 3C:
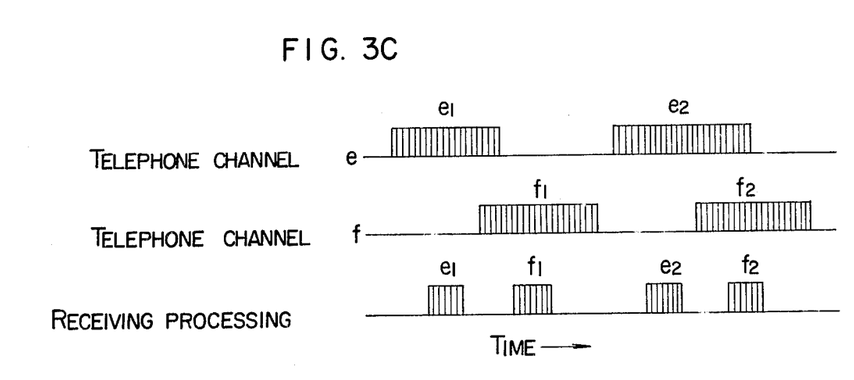
FIG. 3C is a time chart for explaining the time-division multi-processing of a multi-frequency signal receiver using the digital filter in accordance with the present invention.

FIGS. 3A, 3B and 3C show time relations between the PB signals from a plurality of subscriber lines and the filter channels.

The multi-processing using the digital filter has dual meaning. That is, in one case, one frame (corresponding to one sample period) is divided into time domains or channel slots which are equal in number to the number of input channels and the divided time domains or channel slots are fixedly assigned to particular channels as in the PCM time division multiplexing transmission system, and in the other case, in a particular one of the divided time domains, when the absence of the PB signal is detected by the status of the PB signal on a particular input channel, other subscriber line is connected thereto to utilize the channel of the digital filter in a time division multiplexing fashion. This will be explained in further detail with reference to the drawings.

FIG. 3A shows input status of the PB signals from four subscriber lines $a$, $b$, $c$ and $d$. The symbols $a1$, $a2$ and $b1$, $b2$ correspond to dial numbers for the subscriber lines $a$ and $b$, respectively, and they are sampled, encoded and then supplied to the digital filter.

If the time of the above 22 filter channels is short, the first case of the time division multi-processing operation as described above can be performed by assigning each of the channels to the respective divided time domains in the frame, as shown in FIG. 3B.

Under the presence of the PB signal as shown in FIG. 3A, the period during which no signal exists between the dial number signals, or interdigit pause is considerably long. Therefore, it is possible to process the signals of a plurality of input channels in a given assigned time domain, that is, to perform the second case of the time division multi-processing operation described above, by inserting signals of other input channel, e.g. signal $d1$, between the interdigit pause, e.g. between $a1$ and $a2$.

In a prior art PB signal receiver using the digital filter, however, the digital filter is connected to to the telephone set associated with that PB signal, that is, the time domain is occupied in order to monitor the continuity of the PB signal as described above. Accordingly, it has been impossible to enhance the multiplexing operation of the second type. Namely, as shown in FIG. 3C, when the PB signals $e_1$ and $f_1$ and PB signals $e_2$ and $f_2$ from two telephone sets $e$ and $f$ overlap in time, the second type of time division multi-processing operation is impossible.

According to the present invention, as shown in the column "Receiving Processing" of FIG. 3C, the signal processing time of the digital filter is shortened to enable the time division multi-processing for the input PB signals of FIG. 3C for enhancing the efficiency of the utility of the digital filter.

Figure 4:
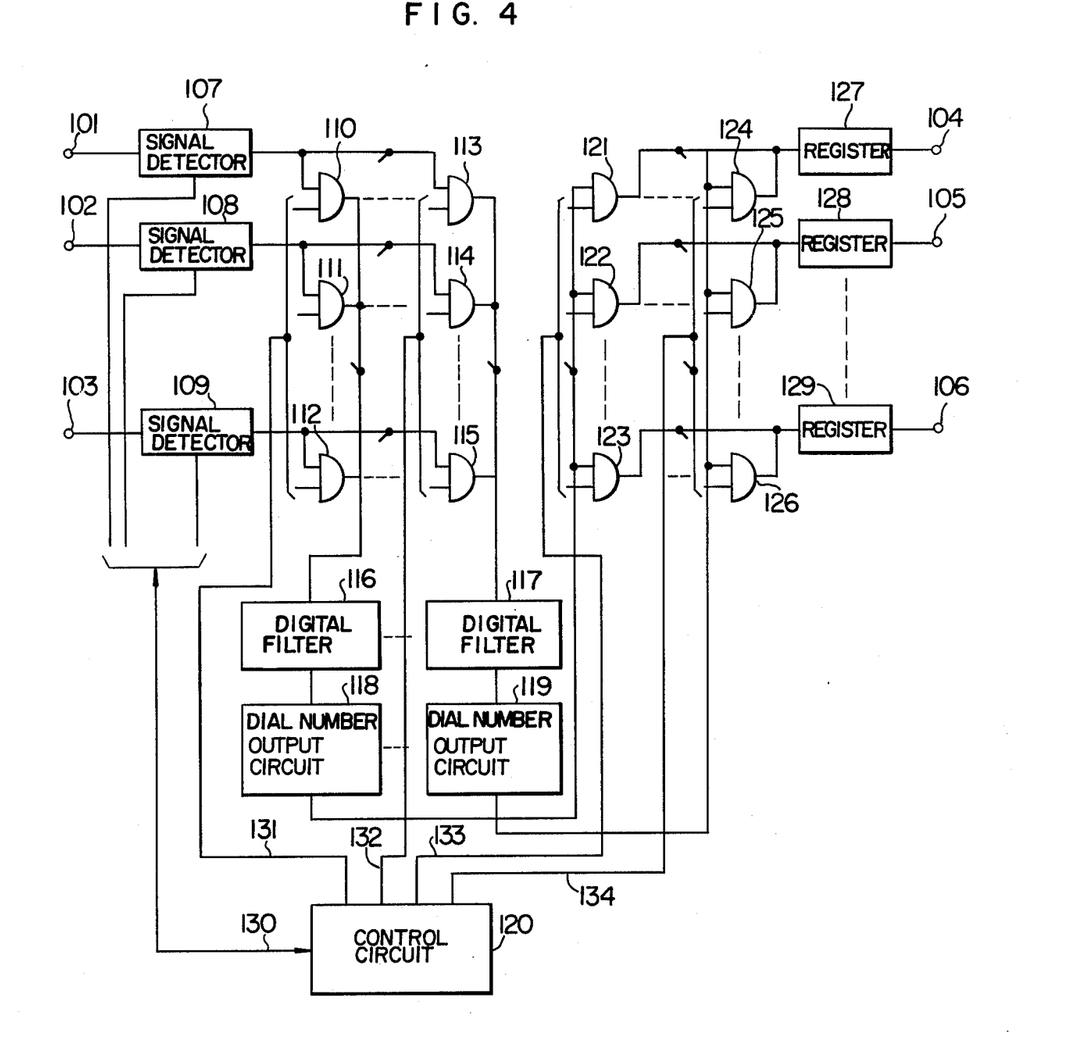
FIG. 4 is a block diagram showing an overall configuration of one embodiment of PB signal receiver in accordance with the present invention.

FIG. 4 is a block diagram showing a construction of one embodiment of a PB signal receiver in accordance with the present invention. The PB signal receiver comprises a circuit for converting digitalized signals (PB signals) of push-phone dialing signals into coded signals which are suited for the operation of the PCM telephone switching system. The PCM telephone switching system and a speech path channel are not explained in detail here because they have no direct connection with the present invention.

In FIG. 4, 101, 102 and 103 are input terminals of the PB signal receiver, to which the PB signals $a1$, $a2$, . . . $b1$, $b2$ . . . , $c1$, $c2$, . . . from the telephone sets $a$, $b$, $c$ in FIG. 3A are applied in the form of digital signal. 104, 104 and 106 are output terminals which correspond to the input terminals 101, 102 and 103. 107, 108 and 109 are signal detecting circuits each provided for each of the input terminals 101, 102 and 103 to detect the presence or absence of the signal. (These circuits will be more fully explained later in connection with FIG. 6.) 110 to 115 are input gate circuits for connecting the input terminal to the digital filter only for a period required to frequency discriminate the PB signal, 116 and 117 are digital filters, 118 and 119 are dial number output circuits for converting the frequencies discriminated by the digital filters into coded signals representing the dial numbers. While a plurality of channels of the gate circuits, the digital filters and the output circuits are shown, it should be understood that the number of the channels reduces as the number of subscriber lines reduces and the present invention can be applied to only one channel configuration. 120 is a connection control circuit which is responsive to the result of the detection by the signal detectors to open or close the input gate circuits 110 to 115 for controlling the connection of the input terminals to non-busy channels of the digital filters. (This circuit will be more fully explained later in conjunction with FIG. 7.) 121 to 126 are output gate circuits for connecting the outputs of the dial number output circuits to the output terminals provided in correspondence to the input terminals, 127, 128 and 129 are output indication registers for indicating the outputs of the dial numbers for each output terminal.

The operation of FIG. 4 will now be described with reference to the PB signal from the telephone set e in FIG. 3C.

When the PB signal $e_1$ from the telephone channel e corresponding to the first dial number is applied to the input terminal 101, the beginning of the signal $e_1$ is detected by the signal detector 107 and applied to the connection control circuit 120, which search a vacant line out of the plurality of subscriber lines multiplexed to the digital filter (e.g., a vacant line in the first digital filter 116) and sends a gate signal to the input gate circuit 110 to connect the input signal to a dial tone elimination filter, or 1N1 in FIG. 2A, which is the first filter channel of the digital filter. The digital filter 116 thus discriminates the frequency representing the dial number of the PB signal $e_1$ through the operation described in connection with FIG. 1 and FIGS. 2A and 2B, and the discrimination output is applied to the dial number output circuit 118 where it is converted to a coded signal representing the dial number, which in turn stored in the output register 127 via the gate circuit 121. When the above operation has been completed, the digital filter 116 is disconnected from the subscriber channel e regardless of the status of the input signal $e_1$. The signal detecting circuit 107 thereafter monitor only the status of the signal $e_1$. After the signal $e_1$ has terminated and the interdigit pause has elapsed, the beginning of the signal $e_2$ representing the second dial digit is detected and the processing of the signal $e_2$ is carried out in a manner similar to $e_1$. In this case, however, the coded signal representing the signal $e_2$ stored is not always processed by the digital filter 116, but it may be processed by a digital filter 117, and the output signal of the filter 117 is stored in the register 127 through the dial number output circuit 119 and the gate circuit 124. In the case that the signal $e_2$ enters the digital filter 116, as shown in the time chart of FIG. 3C, while the digital filter 116 is processing the signals $e_1$ and $e_2$, it also processes (receives) the signal $f_1$ from the subscriber channel f. If all of the time domains of the digital filter are being used for the receiving processing of other telephone lines, other digital filter (e.g. 117) is used.

Figure 5:
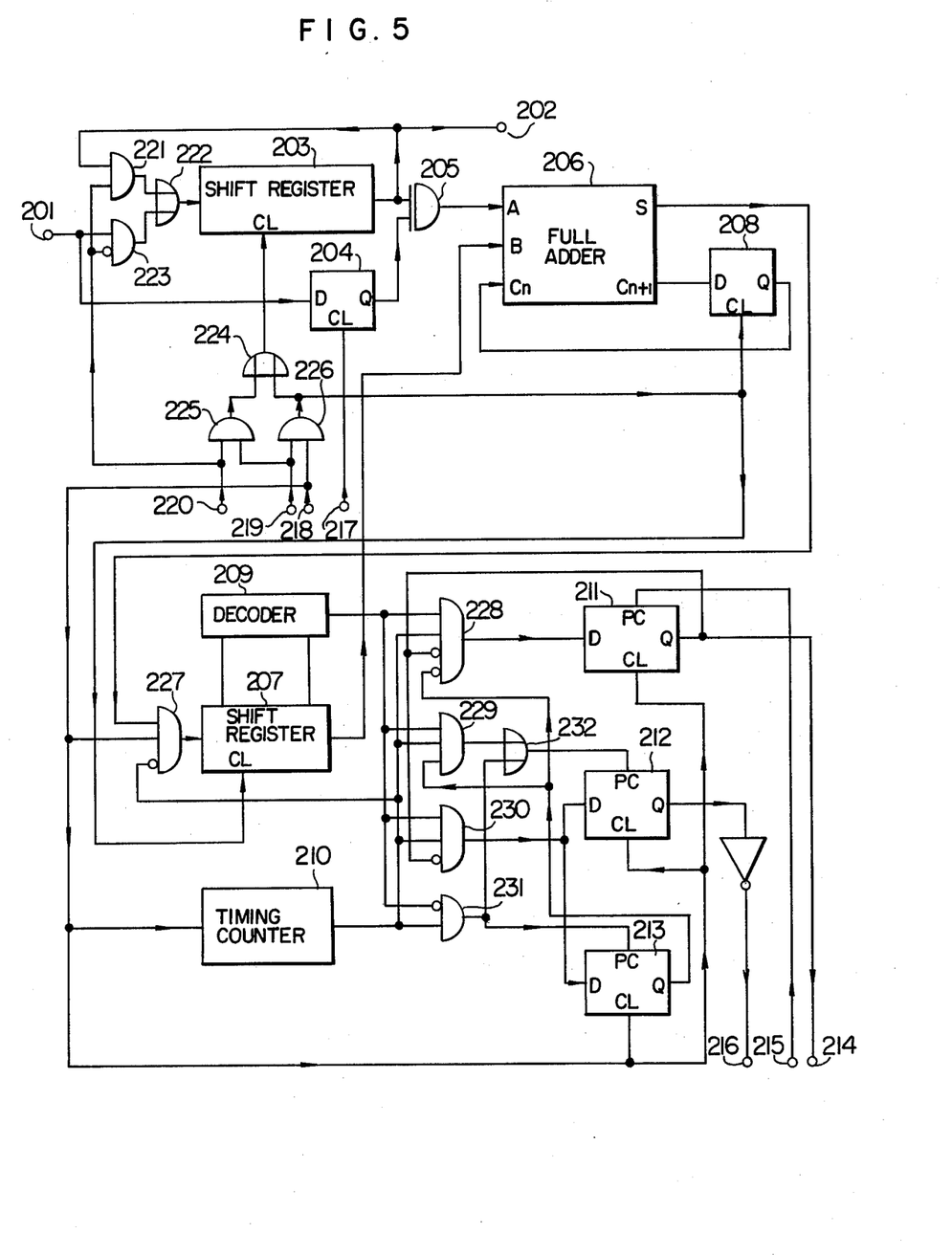
FIG. 5 is a circuit diagram showing one embodiment of a detecting circuit 107 used in FIG. 4.

A construction of the signal detecting circuit (e.g. 107) is shown in FIG. 5. Sampled signals of the PB signal are applied to an input terminal 201 (which corresponds to the terminal 101 in FIG. 4) serially and in the form of digital signals represented by 2's complement format, and stored in a shift register 203 via an AND gate 223 and an OR gate 222. The shift register is constructed to store one sample of the digital bits and it is used as a buffer memory because the change of the filter channel is required when the input terminal 101 is to be connected to the digital filter. The input signals are also applied to a D-type flip-flop circuit 204, which holds an input at the instant of a rise of a clock pulse applied to a clock terminal thereof until the rise of the next clock pulse, when it produces an output. Thus, the D-type flip-flop acts as a kind of delay circuit. The signals from the shift register 203 and the D-type flip-flop 204 are read out by clock signals from an OR gate 224 and a terminal 217, respectively, and applied to an EXCLUSIVE OR circuit 205. The shift register 203, the D-type flip-flop circuit 204 and the logic circuit 205 constitute a full-wave rectifier. A full-wave rectified output from the logic circuit 205 is applied to an input terminal A of a one-bit full adder 205. Applied to terminals 217, 218, 219 and 220 are a clock pulse which is synchronized with a sign bit of the input digital signal, a timing pulse representing a time slot of the input signal, a bit clock pulse and a control pulse synchronized with a pulse opening the gate 110, respectively. A D-type flip-flop 208 serves to hold a carry from the adder 206. An output from the full adder 206 is applied to a shift register 207 via a gate 227. The shift register 207 has the same capacity as the shift register 203 and it integrates the full-wave rectified signal of the digital signal for a predetermined period (e.g. for several sample periods). The integration period is determined by counting timing pulses from the terminal 218 by means of a timing counter 210. A decoder circuit 209 produces an output when a content of the shift register 207 exceeds a predetermined value. Whenever the count of the timing counter 210 reaches a full count, it produces an output which passes through gates 228, 229 and 230 to set D-type flip-flops 211, 212 and 213. Simultaneously, the output of the counter 210 is passed through an AND gate 227 to clear the content of the shift register 207.

The set condition of the flip-flop 211 indicates that the digital signal input has been applied to the input terminal 201 and it is applied through a terminal 214 to the connection control circuit 120 of FIG. 4 as a request signal requesting the connection of the input terminal and the digital filter. When the connection control circuit shown in FIG. 6, which will be explained later, connects a particular digital filter with the input telephone line in response to the request signal, a pulse signal is applied from the connection control circuit through a terminal 215 to the D-type flip-flop 211 to reset the same.

As the input digital signals further occur, the counter 210 again reaches its full count and the flip-flop 212 is reset. By the reset of the flip-flop 212, a signal is sent to the terminal 216 so that the input circuit 101 is disconnected from the digital filter by the control circuit 120 and the gate circuit 110. As the input digital signal terminates, the flip-flops 212 and 213 are reset and the flip-flops 211, 212 and 213 are restored to their initial states. Control pulses which are in synchronism with the opening of the input gate circuit 110 are applied to the terminal 220 and the content of the shift register is sent to the digital filter through the terminal 203.

Figure 6:
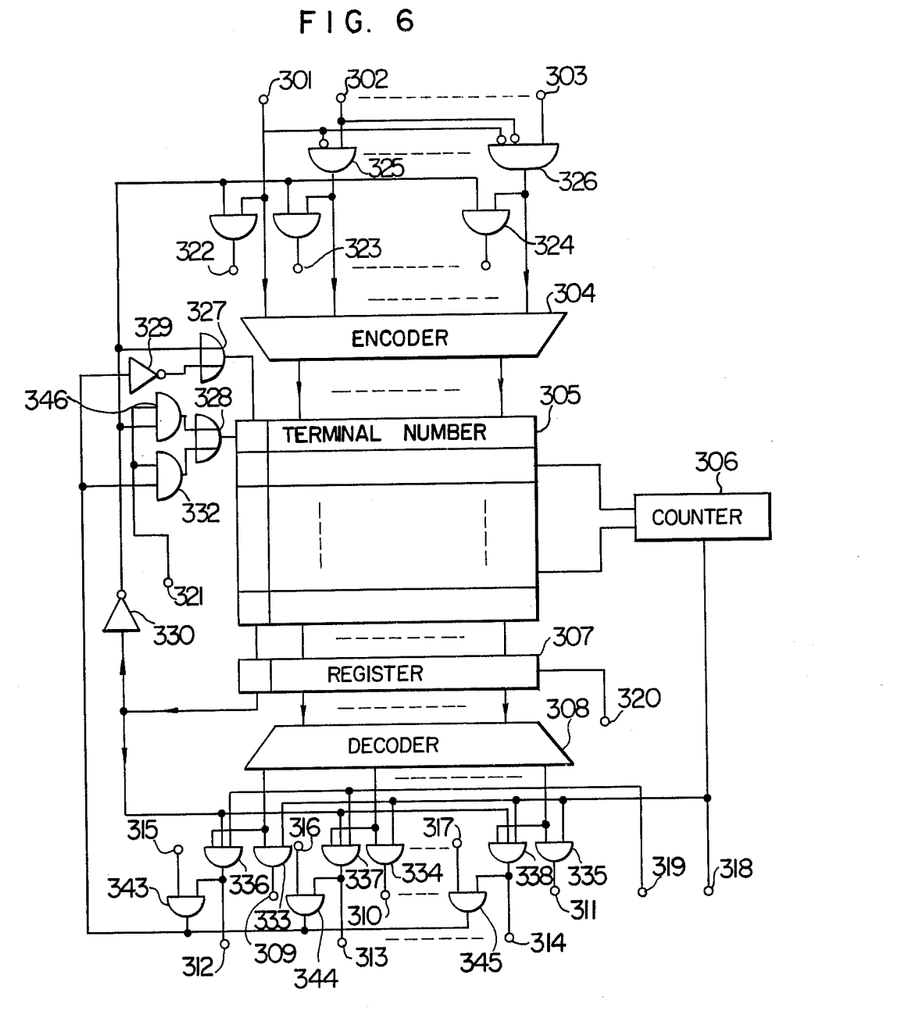
FIG. 6 is a circuit diagram showing a construction of an embodiment of a control circuit 120 shown in FIG. 4.

FIG. 6 shows a construction of the connection control circuit 120 of FIG. 4. A connection request signal from the terminal 214 of FIG. 5 is applied to one of input terminals 301, 302, 303 in FIG. 6. AND gates 325, 326 serve to impart priority for the acceptance when the connection request signals are simultaneously received from a plurality of subscriber lines. The connection request signal is converted to a terminal number indicating the subscriber line by an encoder 304 and stored in a memory 305. The memory 305 includes words each comprising terminal number bits and one bit for indicating busy of the associated PB receiver, the number of the words being equal to the number of multiplicity of the receiver including the digital filters. The addresses of the respective words are specified and read out circulatively at a cycle of time slot assigned to the signal processing for the signals of one subscriber line, and then stored in a register 307. If the busy indicating bit of the register 307 indicates vacancy, the input terminal number of that subscriber line to which the connection request has been issued is written at that address and it is also applied to AND gates 322, 323, 324 through an inverter 330. Thus, an output is produced from that one of the AND gates which corresponds to the subscriber line to which the connection request has been issued. This output is applied to the terminal 215 in FIG. 5 as a signal indicating that the connection request has been accepted. At the same time, the terminal number read out in the register 307 is decoded by a decoder 308 and gated by a time slot specifying pulse from an operation timing pulse generating circuit, not shown, to produce input and output gate control pulses each of which is passed through one of AND gates 333, 334 and 335 and one of terminals 309, 310 and 311 to one of the lines 131 and 132 in FIG. 4, and also passed through AND gates 336, 337 and 338 and one of terminals 312, 313 and 314 to one of the lines 133 and 134 in FIG. 4. The terminal 216 of FIG. 5 is connected to terminals 315, 316 and 317. When a pulse is applied to one of these terminals, it passes through one of AND gates 343, 344 and 345 and an inverter 329, an OR gate 327 to change the busy indicating bit of the memory to indicate vacancy. Through this operation, the input terminal is disconnected from the receiver. Applied to terminals 320 and 321 are a read memory pulse and a write memory pulse, respectively, which are produced from the operation timing pulse generating circuit, not shown. Applied to a terminal 318 are a receiver number and an updating pulse, and applied to a terminal 319 is a pulse for controlling time slot of the receiver.

Figure 7:
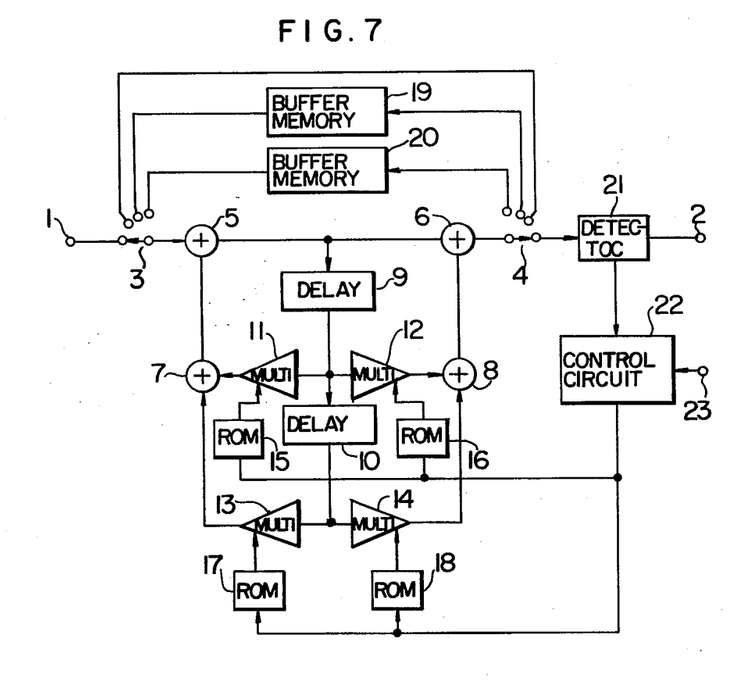
FIG. 7 is a circuit diagram showing a construction of an embodiment of a digital filter used in FIG. 4.

FIG. 7 is a block diagram showing a construction of the digital filter 116 or 117 of FIG. 4, in which the reference numerals 1 to 20 designate the same parts having the like numerals in FIG. 1. Numerals 21 and 22 designate a detector for an output of a signal frequency band pass filter and a coefficient control circuit, respectively.

Figure 8:
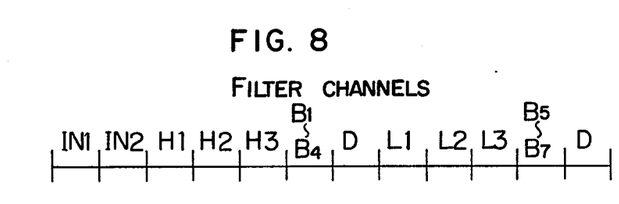
FIG. 8 is a time chart for a filter channel for explaining the operation of the digital filter shown in FIG. 7.

The digital filter of FIG. 4 may be a known digital filter, but when the digital filter of the present embodiment is used, the number of the filter channels required to process the PB signals from one telephone set is considerably reduced as shown by the filter channels in FIG. 8. Thus, the reception processing rate is increased and the degree of multi-processing is enhanced.

Figure 9:
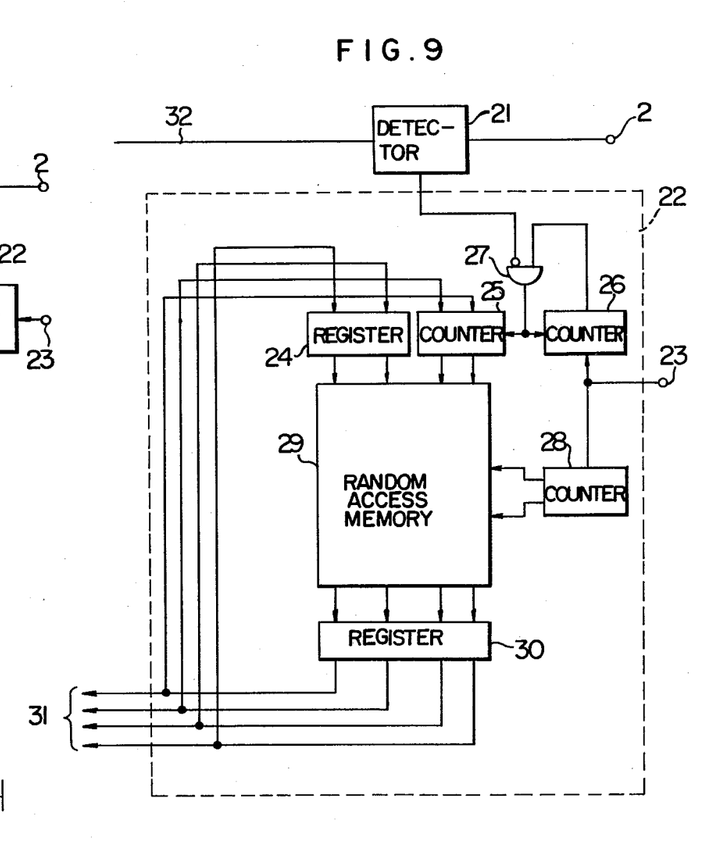
FIG. 9 is a circuit diagram showing a construction of a control circuit 22 in FIG. 7.

Referring now to FIGS. 7 and 9, the construction and the operation of the digital filter in accordance with the present embodiment are explained.

The detection circuit 21 detects the presence or absence of output signals coupled to filter channels B1 to B4 or B5 to B7. The output of the detection circuit 21 is applied to the control circuit 22 which establishes a coefficient corresponding to the band pass filter B1 tuned to a given frequency, e.g. 697 Hz to monitor the output of the detection circuit at the timing of the rise time of the filter. If the output is absent, the assignment of the coefficient memory is changed to e.g. 770 Hz. The above operation is repeated until the output from the detection circuit 21 appears, when the coefficient at that moment is held and the monitor of the signal is continued.

FIG. 9 shows a construction of the control circuit 22, in which 32 is an output line from the digital filter, 2 is an output terminal, 23 is an input terminal for a channel pulse indicating channel interval, 21 is the detection circuit, 22 is the control circuit, 28 is a counter an content of which indicates an address of a random access memory (RAM) 29. 30 is a register for storing data read out of the RAM 29, an content of which register specifies an address of a ROM for storing the coefficients. 24 is a register for storing higher order bits of the register 30, 29 is a settable counter for storing lower order bits of the register 30 and it counts output pulses from a gate 27. 26 is also a counter which counts channel pulses from a line 23 and which is reset by the output from the gate 27.

The RAM 29 includes words each corresponding to one of multiplexed channels of the digital filter and the content thereof is an address of the ROM in which the coefficient of the digital filter is accomodated. The content of the RAM is sequentially read from the address specified by the counter 28 which counts the channel pulses from the terminal 23, to establish the coefficient. By rewriting the content of the RAM 29 by an appropriate means, not shown, any function can be established to the respective channel of the digital filter within the range of the coefficients accomodated in the ROM.

If the coefficient of the band pass filter of e.g. 697 Hz is set to the channels B1 to B4 in FIG. 8, the counter 26 is reset. When the counter 26 counts a number of channel pulses which corresponds to the sampling periods corresponding to the rising time of the signal from the filter, it sends logical "1" output to the gate 27. If the output of the detection circuit 21 is logical "0" at this time indicating the absence of the signal frequency of 697 Hz, the gate 27 produces logical "1" output to increment the content of the counter 25 by one and reset the counter 26. A ROM address data comprising the contents of the register 24 and the counter 25 thus modifys the assigned address of the ROM by one and are written into the locations of the RAM 29 corresponding to the channels B1 to B4. If the coefficient of the band pass filter of 770 Hz has been stored at the newly specified address of the ROM, the filter function of the channels B1 to B4 is changed from the subsequent sampling period. The filter output of 770 Hz is again checked for the presence and absence at the timing of the counter 26. If the presence of the output is detected, the detector 21 produces logical "1" output so that the output of the gate 27 remains "0" even when the output of the counter 26 becomes "1." Therefore, the counter 25 does not count up and the coefficient remains unchanged. When there are a plurality of channels to be monitored, such as the channels B1 to B4 and B5 to B7 as shown in FIG. 8, it is sufficient to provide as much counters 26 as the number of channels to be monitored.

As described hereinabove, in accordance with the present invention, the signal detection circuit as shown in FIG. 6 is provided for each of the input terminals as shown in FIG. 4 and the connection between the input terminals and the digital filter is controlled by the connection control circuit shown in FIG. 7 so that the digital filter is used only for the period required to discriminate the signal frequencies. In this manner, the efficiency of the utility of the digital filter which occupies a substantial hardware volume in the signal receiver can be enhanced and an economy of an overall receiver is improved.

Furthermore, where the filter as shown in FIG. 8 is used, the number of channels of the filter required can be considerably reduced and the number of the digital filters used in the multi-frequency receiver can also be reduced.

I claim:

1. A multi-frequency signal receiver including a plurality of input circuits to each of which a channel signal is added in the form of successive digital signals, and at least one multi-processing digital filter for discriminating frequency components included in the channel signal to reproduce information represented by a combination of the frequency components which comprises:
   signal detection circuits, provided for respective ones of the plurality of input circuits, for detecting the beginning, the duration and the end of an input signal thereto; and
   a connection control circuit, responsive to the outputs of said signal detection circuits, to connect said digital filter with an input circuit, to which an input signal is applied, only for a predetermined time period which is shorter than the duration of said input signal starting from the beginning of said input signal.

2. A multi-frequency receiver comprising:
   a plurality of input terminals for receiving PB signals;
   detecting circuits one for each of said input terminals for detecting the beginning, the duration and the end of the input PB signal;
   at least one digital filter;
   a plurality of input gate circuits provided between said input terminals and said digital filter;
   an encoder circuit for converting an output from said digital filter to a coded signal representing information;
   a plurality of output gate circuits provided between said encoder circuit and a plurality of output terminals; and
   a connection control circuit responsive to the outputs of said detecting circuits for detecting a vacant filter channel and for activating one of said input gate circuits and one of said output gate circuits corresponding to said vacant filter channel only for a predetermined period required for the operation of said digital filter.

3. A multi-frequency signal receiver according to claim 2, wherein said detecting circuit includes a circuit for full-wave rectifying an input signal thereto, a circuit for integrating the output of said rectifying circuit for a predetermined time period, a circuit responsive to the output of said integration circuit to supply a signal indicating a request for connection to said connection control circuit, a circuit for supplying an input signal to said input gate circuits when said connection control circuit operates, and a circuit for supplying a signal requesting the disconnection to said connection control circuit when a predetermined time period has been elapsed since the application of said input signal to said input gate circuits.

4. A multi-frequency signal receiver according to claim 3, wherein said connection control circuit includes an encoder for converting a terminal number of the line over which said request for connection signal is sent to a coded signal, a memory for storing words each comprising an address of one of the channels in the digital filter and a bit indicating busy or non-busy of the channel belonging to said address, a circuit responsive to the readout of a word having the bit indicating non-busy to write the terminal number in said encoder into said address and simultaneously send to the detecting circuit a signal indicating that the connection has been made, and a circuit for decoding the connected terminal number stored in said memory to assign a predetermined time slot for sending activating pulses to said input gate circuits and said output gate circuits.

5. A multi-frequency signal receiver according to claim 2, wherein said digital filter includes signal detection circuits corresponding to the filter channels for signal frequency discrimination, and a control circuit which operates to sequentially change a coefficient to the channel connected to the detection circuit to coefficients corresponding to other filters for signal frequency discrimination unless said detection circuit produces a signal output for a predetermined time period and repeats the above operation until said detection circuit detects the signal output, when it holds the coefficient at that moment and monitors the output of said detection circuit until said signal output terminates.

* * * * *